United States Patent Office 3,535,089
Patented Oct. 20, 1970

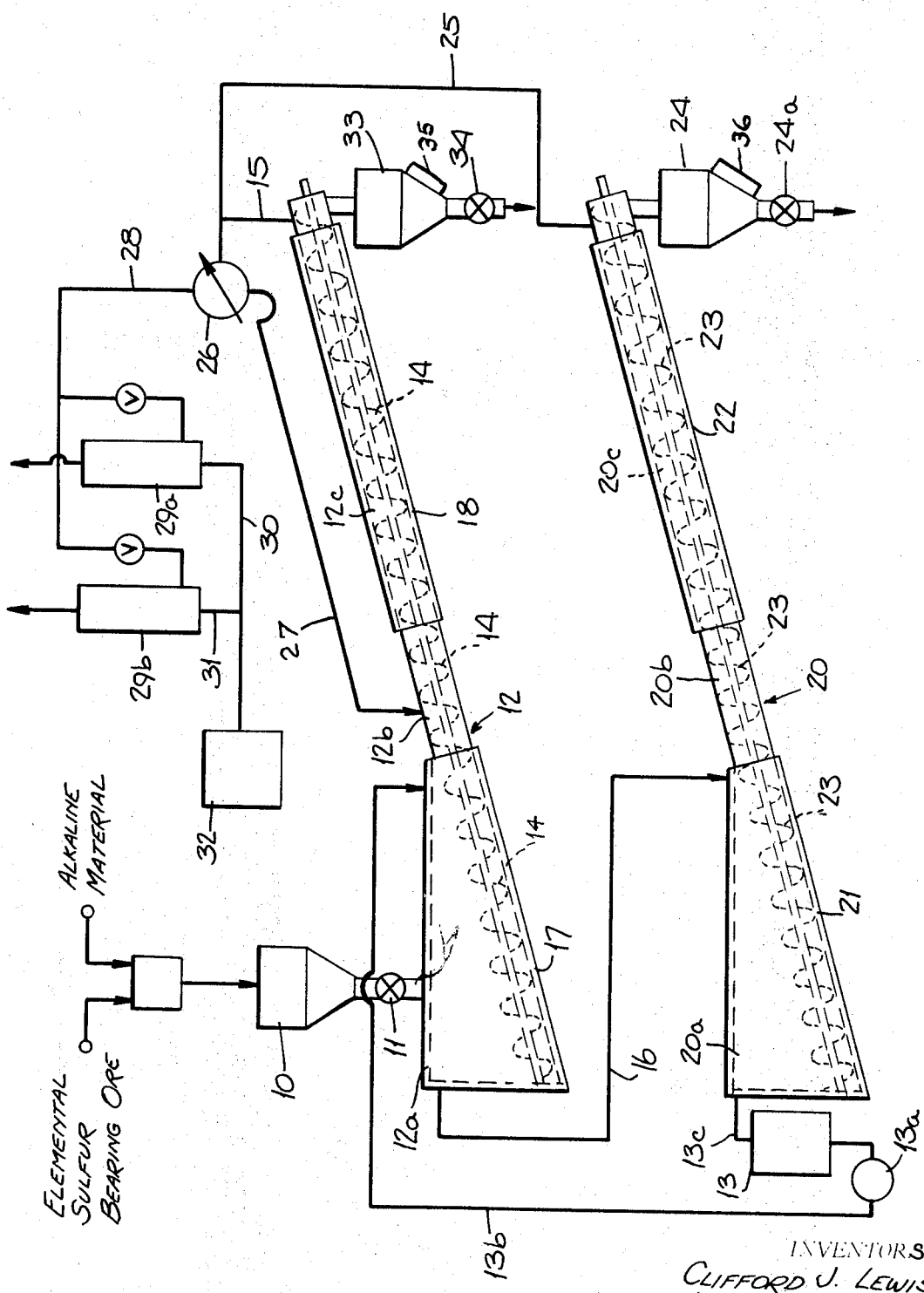

3,535,089
SULFUR EXTRACTION USING TRICHLOROETH-YLENE IN PRESENCE OF LIMESTONE, TRONA, AND SODA ASH
Clifford J. Lewis, Denver, Colo., and Jean P. Champagne, deceased, late of Santa Monica, Calif., by Jean McPherson, Malibu, Calif., and June Paramore, Las Vegas, Nev., beneficiaries; said Lewis assignor to Chapman, Wood & Griswold, Ltd., North Vancouver, British Columbia, Canada
Filed Sept. 12, 1968, Ser. No. 759,828
Int. Cl. B01d 11/02; C01b 17/08
U.S. Cl. 23—312
7 Claims

ABSTRACT OF THE DISCLOSURE

The invention involves a new process and apparatus in which solvent used in the recovery of elemental sulfur from sulfur bearing material is continuously recycled through the system in a manner which prevents solvent loss. The solvent contacts the elemental sulfur bearing material in the presence of an alkaline material under conditions which permit the continuous use of the original solvent without effect upon the purity or amount of sulfur recovered.

BACKGROUND OF THE INVENTION

1. The Frasch process

The major recovery of elemental sulfur from natural deposits is by the Frasch process which consists essentially in pumping water under pressure and above its boiling point deep into sulfur bearing strata in the earth. As a result of this treatment, the sulfur melts to a liquid and is forced to the surface through suitable piping where the sulfur emerges as a marketable grade product. There are, however, deposits of elemental sulfur which are not technically and/or economically amenable to Frasch sulfur mining. This may be because the sulfur deposit is too near to the surface to withstand the pressures generated by Frasch mining, or the deposit may be in a mineral or a rock structure which does not permit adequate penetration of the hot water of the Frasch process, or the elemental sulfur may occur in a structure such as volcanic ash which is so porous as to cause impractical mechanical difficulties during Frasch mining. In such cases, it is necessary to mine the sulfur bearing ore either by open pit or underground mining procedures and to recover the sulfur by further processing. In addition, elemental sulfur not recoverable by Frasch mining may be found in silt and mud in lake bottoms as the result of the percolation and reuse of sulfur gases in the lake water in past geological times. It has been unsuccessfully proposed that solvents be used to extract sulfur from the deposits above described.

2. Solvent extraction

While solvent extraction has been suggested as a method for recovering sulfur, there have been insurmountable economic and technical difficulties associated therewith of such scope as to make it a virtually unused method of sulfur recovery. One of the basic problems of the solvent extraction processes is that of rapid solvent consumption during the extraction of the sulfur. Solvent consumption or, as it is more commonly called, "solvent loss" results from the side reaction between the solvent and the sulfur bearing material, from the inclusion of the solvent in the crystallized sulfur and in the gangue residue, and from the degradation of the solvent as it is used. The cost of solvent used in the solvent extraction process and its total consumption has made the process completely uneconomical to use in the recovery of sulfur. This fundamental problem has long been recognized by industry and agriculture. Nonetheless, despite the great demand and need for sulfur and the innumerable efforts made, the problem has not been heretofore solved. The difficulty encountered in using the solvent extraction process is made manifold by the many other problems which are presented. For example, many of the solvents suggested are flammable and in some cases, violently explosive when the solvent vapor is mixed with air. Another problem arising in the solvent process is that of sulfur scaling occurring in the pumps, lines and equipment which necessitated frequent shutdowns of the operation in order to remove the scale. Still another problem arising is that of corrosion as most sulfur ores and concentrates contain some moisture either mechanically or chemically combined. In the presence of sulfur, this moisture generates aqueous acids of sulfur which selectively wet and thereby damage wet metal surfaces. Another problem is presented by the fact that with the use of heretofore known processes and apparatus, the solvent is retained in the final sulfur product.

In accordance with the present invention, however, a method has been devised which will enable the solvent to be used and reused so that the solvent extraction method for recovering sulfur is completely economical while, nevertheless, producing sulfur of pure grade from elemental sulfur bearing ores. This result is accomplished without the occurrence of any scaling or corrosion. Furthermore, the recovered sulfur and the gangue residue has no solvent content. The process of the present invention is such that the solvent originally placed in the system is continuously recycled and used again and again without substantial solvent loss or any deterioration of the ability of the solvent to extract sulfur from the ore.

In connection with the description of the invention which follows, reference may be made from time to time to a particular solvent, other particular ingredients and to an apparatus in a specific form. However, this description is not to be construed as a limitation upon the scope of the invention, but is instead used to facilitate an understanding thereof.

THE OBJECT OF THE INVENTION

It is a primary objective of this invention to provide an economical, technically feasible process and apparatus for the prevention of solvent loss in the extraction of high grade sulfur from elemental sulfur bearing material. This and other objects of the present invention will be apparent from the following description.

SUMMARY OF THE INVENTION

The object of the invention has been accomplished with solvent loss prevented by means of an integral, self-contained, recycled substance using a hydrocarbon solvent in conjunction with a substance which maintains the pH of the ore and the sulfur saturated solvent in the range of from about 3 to about 8 during the solvent extraction operation. For example, the hydrocarbon solvent may be trichloroethylene, although other chlorinated hydrocarbons and other solvents such as aromatic hydrocarbons and aliphatic hydrocarbons may be utilized. Some of these other materials are cyclohexane, hexane, trichlorethane, benzene, and toluene. It is one of the discoveries of the present invention, however, that the use of trichloroethylene or similar solvents alone does not prevent solvent loss, degradation or other problems described hereinbefore because most sulfur bearing materials contain acids of sulfur, formed by reaction of sulfur with air and moisture. These acids of sulfur then accompany the sulfur into the sulfur extraction process. In the presence of such acid, solvents such as trichloroethylene tend to become decomposed to other principal products in acid form such as chloracetic and hydrochloric acid. The resultant solvent loss and corrosion makes any process using such solvents alone far too expensive and presents many technical difficulties.

It has now been found that the many problems involved in solvent extraction processes are overcome by modifying the solvent with an alkaline material. It is possible in accordance with the present invention to continuously use the same solvent in a recycling system. This modification may not be accomplished by all types of alkaline materials. Instead, it has been discovered that only a particular type or class of alkaline materials can be used. The materials must be such that they are capable of adjusting and maintaining the pH of the ore and sulfur saturated solvent in the range of from about 3 to about 8. It has been found that such materials as limestone and trona reduced to a suitable fineness may be used to accomplish the desired result. In addition, soda ash may be utilized. These materials function successfully in maintaining the pH range aforesaid during the solvent extraction operation and do not react with the solvent even when they are present in some excess amounts.

The entire process which takes place with a minimum amount of integral self-contained and relatively simple apparatus enables the continuous use of the solvent in a system which at all times permits the vaporization of the solvent without affecting the recovered sulfur.

Briefly stated, the present invention accomplishes the vaporization, recovery and recycling of all solvent used in the system. The system is such that the solvent may be vaporized either because it has a lower boiling point than the melting point of sulfur or by suitably adjusting vaporization conditions. The system is modified to maintain a controlled range of pH. It is preferred that the contacting between the solvent and the ore takes place at a temperature below the melting point of sulfur and the preferred process will be described hereinafter. The sulfur saturated solvent containing dissolved sulfur is separated from residual feed and cooled to crystallize elemental sulfur. The crystallized sulfur is separated from the solvent, the residual solvent from the crystallized sulfur and from the gangue recycled. The cooled solvent which contains some crystallized sulfur is recycled to the contacting stage. The process of the present invention may be carried out in many different ways. For example, the process may be utilized in either continuous or batch operations and the sulfur containing feed and the solvent may be contacted in any convenient manner, whether it be countercurrently or cocurrently. Agitators may be used to facilitate contacting and the use of one or more vessels for carrying out the process is also contemplated.

DESCRIPTION OF THE DRAWING

The figure is a flow sheet showing in block form apparatus for performing the process of the present invention.

DETAILED DESCRIPTION

The present invention while accomplishing the continuous use of small amounts of solvent to recover large quantities of pure sulfur from elemental sulfur bearing ore uses a system of apparatus having relatively few parts. As shown in the drawing, the pure sulfur is separated from the gangue and from the solvent in two relatively elongated units and the reclamation and continuous use of the solvent is accomplished by a series of conduits, a condenser and tanks containing activated carbon. Despite the similicity of the construction, however, it has been found to accomplish a method which is completely effective, efficient and extremely economical.

A specific arrangement is shown in the drawing for illustrative purposes only. In the apparatus, the elemental sulfur feed material which has been crushed to an appropriate size, as for example, that which would pass a ⅝" mesh screen, is admixed with an alkaline material such as soda ash and is introduced into a feed hopper 10 from which it passes through Star valve 11 into the leaching unit 12, which comprises three unseparated chambers viz: a settling section 12a, an intermediate section 12b and a vaporizing section 12c. Contact is established between the sulfur and the solvent in the settling tank portion 12a of the leaching unit 12. It is to be noted that the entire leaching unit 12 is disposed on an incline and is provided with temperature control jackets 17 and 18, respectively covering the settling section 12a and the vaporizing section 12c for the purposes hereinafter described. As the same time that the elemental sulfur and modifying material are introduced into the leach unit, and particularly the settling section 12a, a solvent such as trichloroethylene taken from the solvent input tank 13 is introduced via pump 13a and conduit 13b. At the start of the operation, of course, the tank 13 is newly filled with the solvent. However, as will be shown, once the process is begun, the solvent tank 13 is continuously refilled from the recycled solvent passing through the system. It is preferable that the solvent pass through the conduit 13b at an elevated temperature. The solvent contacts the sulfur which has entered the settling section 12a of leaching unit 12 via Star valve 11 and which is being forced upwardly in the inclined plane by means of a conveyor. Broadly stated, in continuous operation, the elemental sulfur bearing feed material may be introduced near one end of section 12a and may move upwardly after contacting the solvent. Similarly, the solvent may be introduced as shown near one end of section 12a and withdrawn from the other end of that section. The feed material and solvent may be introduced at about opposite ends of the reactor to effect countercurrent contact. The solvent is maintained at an elevated temperature but below its boiling point. The solvent dissolves the elemental sulfur in the sulfur bearing material. Sulfur-free residual feed or gangue falls to the bottom of the section 12a from which it may be removed by a conveying mechanism 14 in the form, for example, of a helical screw provided with openings to permit the free flow of the solvent. The solvent flows countercurrently to the elemental sulfur bearing material and is withdrawn from the section 12a via conduit 16 after having dissolved the sulfur from the feed material. By use of steam, hot water, or other temperature transferring fluid in temperature control jacket 17, section 12a may be maintained at or near the vaporization point of the solvent. When trichloroethylene, specifically is used, the preferred temperature ranges throughout the system are set forth in the following description. The temperature range of the settling section 12a may be from about 156° F. to about 188° F. The vaporizing section 12c of leaching unit 12 may be maintained at or somewhat below or above the vaporizing point of the solvent. The temperatures in the vaporizing section may be from about 156° F. to about 235° F. The temperature in the unclad intermediate section 12b of the leaching unit 12 may be in the temperature range of from about 130° F. to about 150° F.

The sulfur saturated solvent passes through a conduit 16 into a crystallizing unit 20 which is also divided into three unseparated chambers. The crystallizing unit comprises three compartments viz: the base 20a and intermediate unit 20b and the vaporizing unit 20c. The base and the vaporizing unit are provided respectively with temperature control jackets 21 and 22. The temperature of conduit 16 is preferably maintained in the range of from about 156° F. to about 188° F. to prevent crystallization therein of the dissolved sulfur. The base 20a of the crystallizing unit is maintained at a temperature of from about 32° F. to about 80° F. which causes sulfur crystals to form. Temperature control of crystallizer 20 is accomplished by passing coolant through jacket 21. As the sulfur crystallizes in section 20a by virtue of its lower solubility in cold solvent than in hot solvent, the cryspers is ultimately recovered. The vapors pass through the condenser back into the system and non-condensed solvent present in fixed gases is reclaimed through the bed of activated carbon. The solvent from the base of the crystallizer unit is returned to the leaching unit and reused. The process therefore, provides a system which is extremely economical in that small amounts of solvent may be continuously recycled to recover large quantities of pure sulfur from elemental sulfur bearing ore without loss. The advantages of such a system in recovering heretofore unreclaimable sulfur are manifold. As a result, it is possible to now use sulfur deposits which could not, as a practical matter, be heretofore utilized with the consequent benefits to industry and agriculture.

It will, of course, be understood that the foregoing description with the details of exemplary structure is not to be construed in any way to limit the invention, but that modification may be made thereto without departing from the scope of the invention as set forth in the following claims.

What is claimed is:

1. A process for preventing solvent loss in the solvent extraction of elemental sulfur from an elemental sulfur bearing material which comprises:
   comminuting a sulfur bearing ore;
   admixing therewith an alkaline material selected from the group consisting of limestone, trona, soda ash, borax, sodium bicarbonate, ammonium carbonate, ammonium bicarbonate, or oxides of alkali metals in an amount sufficient to maintain the solution pH of the mixture within a range of from about 3 to about 8;
   contacting the mixture thereof with a hot solvent selected from the group consisting of trichloroethylene, perchloroethylene and trichloroethane in a leaching zone at a temperature below the melting point of sulfur;
   separating sulfur from the solvent;
   reclaiming and recycling the solvent; and
   continuously reusing the solvent over a substantial period of time without degrading the solvent or affecting the purity of the sulfur separated therefrom.

2. A process according to claim 1 wherein the sulfur is separated from the solvent by crystallization.

3. A process according to claim 1 wherein residual sulfur bearing ore after removal of sulfur therefrom is contacted with additional solvent.

4. A process according to claim 3 wherein the additional solvent is recycled solvent.

5. A process for preventing solvent loss in the solvent extraction of elemental sulfur from an elemental sulfur bearing material which comprises:
   comminuting a sulfur bearing ore;
   admixing therewith an alkaline material selected from the group consisting of limestone, trona, soda ash, borax, sodium bicarbonate, ammonium carbonate, ammonium bicarbonate, or oxides of alkali metals in an amount sufficient to maintain the solution pH of the mixture within a range of from about 3 to about 8;
   contacting the mixture thereof with a hot solvent selected from the group consisting of trichloroethylene, perchloroethylene and trichloroethane in a leaching zone at a temperature below the melting point of sulfur;
   separating sulfur from the solvent crystallization of said sulfur;
   recovering solvent vapors from the process;
   subjecting the solvent vapors to a condensation step; and
   recycling condensed solvent.

6. A process according to claim 5 wherein uncondensed vapor from the condensation step is treated with activated carbon and recycled.

7. A process for continuously reusing solvent in the extraction of elemental sulfur from a sulfur containing ore which comprises the steps of
   comminuting a sulfur bearing ore;
   admixing therewith an alkaline material selected from the group consisting of limestone, trona, soda ash, borax, sodium bicarbonate, ammonium carbonate, ammonium bicarbonate, and oxides of alkali metals in an amount sufficient to maintain the solution pH of the mixture within a range of from about 3 to about 8;
   contacting the mixture with a hot solvent for sulfur selected from the group consisting of trichloroethylene, perchloroethylene and trichloroethane in a leaching zone at a temperature below the melting point of sulfur;
   removing said solids from said leaching zone to a vaporizing zone;
   removing residual solvent from said solids in said vaporizing zone and recycling said residual solvent to the process;
   removing the solids from said vaporizing zone and discarding them from the process;
   passing sulfur laden solvent from said leaching zone to a crystallization zone;
   lowering the temperature of said sulfur laden solvent in said crystallization zone to one at which said sulfur crystallizes from said solvent;
   recycling substantially sulfur free solvent from said crystallization zone to said leaching zone;
   removing crystallized sulfur from said crystallizing zone to a second vaporization zone;
   vaporizing residual solvent from said crystallized solvent in said second vaporization zone;
   condensing said solvent vapors and returning condensed solvent to the process; and
   removing a substantially solvent free crystallized sulfur product from the process.

References Cited

UNITED STATES PATENTS

| | | | |
|---|---|---|---|
| 166,279 | 8/1875 | Johnson | 23—312 |
| 833,573 | 10/1906 | Becigneul | 23—312 |
| 927,342 | 7/1909 | Feld | 23—312 |
| 1,253,571 | 1/1918 | Bonneau | 23—312 X |
| 1,963,921 | 6/1934 | Nagelvoort | 23—312 |
| 2,088,190 | 6/1937 | Du Pont | 23—224 |
| 2,316,673 | 4/1943 | McDonald | 23—312 X |
| 2,785,059 | 3/1957 | McDonald | 23—312 X |
| 2,890,941 | 6/1959 | Bartlett | 23—312 X |
| 2,934,414 | 4/1960 | Bradley | 23—312 |
| 3,226,202 | 12/1965 | Nagelvoort | 23—312 X |

NORMAN YUDKOFF, Primary Examiner

S. J. EMERY, Assistant Examiner

U.S. Cl. X.R.

23—224, 299 tallized sulfur is moved up the inclined plane forming the base of crystallizer 20 by means of conveying mechanism 23 in the form, for example, of a helical screw provided with openings to permit the free flow of solvent. This upward movement carries the sulfur into section 20b. Entrained liquid solvent drains back into section 20a and finally flows out of the forward end of section 20a by means of conduit 13c which recycles solvent to leaching unit 12 through the tank 13, pump 13a and conduit 13b.

The crystallized sulfur solids are carried from section 20b by conveying means 23 into the vaporizing section 20c of crystallizer 20. Section 20c is maintained at a temperature of from about 156° F. to about 235° F., at or somewhat below or above the boiling point of the solvent by virtue of the temperature control jacket 22 through which steam or other suitable heating medium is flowing. The sulfur solids are discharged into a hopper 24 above Star valve 23a and are maintained at a temperature of from about 156° F. to about 235° F. or in other words, a temperature sufficiently high to vaporize any solvent entrained in the crystalline sulfur but insufficiently high to melt the sulfur. Sulfur product, free of solvent, is removed from the hopper by means of the Star valve 24a. Solvent vapors are removed via conduit 25 and passed to condenser 26. Condensed solvent is delivered via conduit 27 to the intermediate section 12b of leaching unit 12. Uncondensed gases and noncondensed solvent are drawn through line 28 to a bed of activated carbon. As shown in the drawing, the activated carbon bed is contained within two tanks 29a, 29b so that as the solvent is being recovered from one tank, the other is being filled, and vice versa. Uncondensed gases are vented from the top of tanks 29a and 29b. The recondensed solvent is recovered from the carbon bed, may be passed via conduits 30 and 31, to tank 32 and stored until needed. Therefore, an extremely advantageous economic advantage is obtained in that virtually all of the solvent may be reclaimed and recycled in the continuous system of the present invention.

The sulfur-extracted fed or gangue in section 12a is delivered by conveying means 14 up the inclined plane forming the base of leaching unit 12 into intermediate section 12b where it is contacted by condensed solvent from condenser 26. This solvent is free of sulfur. The solvent, after contacting the sulfur-extracted feed, and removing residual sulfur and entrained sulfur laden solvent, flows by gravity into section 12a. After contacting elemental sulfur bearing feed in section 12A, the solvent, now pregnant with sulfur is removed, as stated above, by conduit 16.

The gangue in section 12b is carried by conveying means 14 into the vaporizing section 12c of leaching unit 12. The vaporizing section is maintained at a temperature of from about 156° F. to about 235° F. by means of hot water, steam, or other temperature transferring fluid in temperature control jacket 18. The gangue is carried into a hopper 33 which is maintained in the same temperature range, whereby all residual solvent entrained with the gangue is removed via conduits 15 and 25 and passed to condenser 26. Gangue is discharged from hopper 33 by Star valve 34. Condensed solvent is recycled to leaching unit 12 via conduit 27. Uncondensed gases and noncondensed solvent is passed by conduit 28 through the bed of activated carbon as hereinbefore described. As aforesaid, to assure the fact that virtually no solvent whatsoever is lost in the continuous system, hoppers for the gangue and the pure sulfur are provided above the Star valves and the contents of the hoppers are packed by means of vibrators in the presence of heat ranging from about 156° F. to about 235° F. At these temperatures the solvent will vaporize without affecting the extracted sulfur. Thus, any residual solvent that is present in the gangue or in the sulfur itself will be vaporized, reclaimed and recycled.

Settling section 12a of leaching unit 12 is maintained below the vaporizing point of the solvent, by means of temperature control jacket 17 and section 12c is maintained at or above the vaporizing point of the solvent by means of steam or other temperature transferring liquid circulating through jacket 18. The absence of any temperature control jacket on section 12b permits the temperature therein to drop well below the vaporizing point of the solvent by heat transfer to the ambient. The foregoing temperature conditions cause the elemental sulfur bearing feed material to move through a zone of hot solvent which dissolves the contained sulfur and removes the dissolved sulfur from the leaching unit. Simultaneously, the gangue moves on upwards through a zone of fresh liquid solvent thus cleaning residual sulfur and sulfur-containing solvent from the gangue which then continues to move upwards through a temperature zone at or above the boiling point of the solvent.

Hoppers 33 and 24 are provided with vibrators 35 and 36, respectively.

The following example illustrates the present invention without, however, limiting the same thereto.

EXAMPLE 1426 pounds of elemental sulfur bearing ore which had been crushed so that it passed through a ¼" mesh screen (U.S. standard screen size) were combined with 17 pounds of sodium carbonate and fed to a hopper. A Star valve at the bottom of the hopper fed the mixture at a rate of 6.6 pounds per hour into a 3.2 gallon capacity inclined leaching unit provided with a helical screw. The leaching unit contained 37.6 pounds of trichloroethylene. The temperature of the leaching unit was maintained at 165° F. by means of a hot water jacket. Heated solvent containing dissolved elemental sulfur was withdrawn at a rate of 38 pounds per hour from a port at one end of the leaching unit and passed to an inclined crystallizer maintained at a temperature of 50° F. At this temperature, sulfur precipitated and fell to the bottom of the crystallizer. Solvent was withdrawn from a port near the top of the crystallizer at a rate of 37 pounds per hour and recycled to the leaching unit. The helical screw carried the precipitated sulfur out of the crystallizer pool into a higher unjacketed portion of the crystallizer. Some solvent carried along with the precipitated sulfur drained back to the crystallizer pool. The precipitated sulfur was then carried by the helical screw from the unjacketed section to a steam jacketed vaporizer section heated to a temperature of 235° F. Entrained solvent was removed as vapor and condensed. Sulfur product was discharged at a rate of 1.1 pounds per hour.

A helical screw carried residual feed from the leaching unit into a higher unjacketed section. Some solvent carried along with the residual feed drained back through apertures in the screw into the settling or leaching pool from this section. The helical screw then carried the residual feed into a jacketed vaporizer section maintained at a temperature of 225° F. Entrained solvent was vaporized, combined with the vapors from the vaporizing section of the crystallizer, condensed and fed to the intermediate unjacketed section of the leaching unit at a rate of 1.5 pounds per hour. Residue was discharged from the discharge section of the leaching unit at a rate of 5.5 pounds per hour.

Another advantage of the present process and apparatus resides in the fact that the sulfur extracted may be in crystalline or rhombic form. No powdered sulfur is present which permits the safe, economic, and easy shipment of the product eliminating danger of explosion and problems arising when the sulfur is in large block form. Of course, if desired, the sulfur may be melted in situ.

It will thus be seen that there is no solvent loss using the process and apparatus of the present invention as the system is such that the solvent present in all areas including the leaching unit, crystallizing unit, conduits, and hop-